United States Patent [19]

Konno et al.

[11] 4,067,791

[45] Jan. 10, 1978

[54] ULTRAVIOLET LIGHT CURABLE COATING COMPOSITIONS

[75] Inventors: Ryozo Konno; Kiyoshi Goto; Toru Matsubara, all of Tokyo, Japan

[73] Assignee: Toyo Ink Manufacturing Co., Ltd., Japan

[21] Appl. No.: 757,930

[22] Filed: Jan. 10, 1977

[30] Foreign Application Priority Data

Apr. 26, 1976 Japan .................................. 51-46634

[51] Int. Cl.² ........................... C08F 8/00; C08F 2/46
[52] U.S. Cl. .............................. 204/159.15; 96/115 P; 204/159.14; 204/159.16; 204/159.19; 260/22 CB; 260/23 AR; 260/40 R; 260/42.21; 260/836; 260/837 R; 427/54; 428/418; 428/463; 428/481

[58] Field of Search ................... 204/159.18, 159.23, 204/159.15, 159.19, 159.16, 159.14; 96/115 P; 260/22 CB, 23 AR, 837 R

[56] References Cited

U.S. PATENT DOCUMENTS

| | | | |
|---|---|---|---|
| 3,926,641 | 12/1975 | Rosen | 96/115 P |
| 4,004,998 | 1/1977 | Rosen | 204/159.22 |

*Primary Examiner*—Richard B. Turer
*Attorney, Agent, or Firm*—Bucknam and Archer

[57] ABSTRACT

Ultraviolet light curable coating compositions comprising (1) a monomer and/or prepolymer containing at least one radically crosslinkable ethylenically unsaturated double bond and (2) a photopolymerization initiator containing (a) 4,4'-bis(diethylamino)benzophenone and (b) a lower alkyl ester of p- or o-benzoylbenzoic acid or a derivative thereof in a weight ratio of (a) to (b) of 1 : 1 to 1 : 10.

8 Claims, No Drawings

ULTRAVIOLET LIGHT CURABLE COATING COMPOSITIONS

This invention relates to an ultraviolet light curable coating composition capable of being rapidly cured by irradiation with ultraviolet light. More particularly, it relates to an ultraviolet light curable coating composition comprising (1) a monomer and/or prepolymer containing radically cross-linkable ethylenically unsaturated double bond or bonds and (2) a photopolymerization initiator containing 4,4'-bis(diethylamino)benzophenone and a $C_1 - C_4$ lower alkyl ester of p- or o-benzoylbenzoic acid or a derivative of said ester in a ratio by weight of from 1 : 1 to 1 : 10.

There are known various coating compositions which are curable in the presence of a photopolymerization initiator by irradiation with ultraviolet light. Intensive studies are now being made in an attempt to produce non-solvent type coating compositions such as printing inks and paints, which are rapidly curable at ambient temperature instead of being thermally curable, and eliminate possible environmental pollution, particularly air pollution otherwise caused by solvents.

Such non-solvent type coating compositions owe their rapid curability which is one of the advantages of this curing system, partly to the curability of the monomer and/or prepolymer contained in the composition and predominantly to the action of the photopolymerization initiator contained therein. Many photopolymerization initiators have hitherto been known, typical of which are benzoin derivatives such as benzoin methyl ether and benzoin ethyl ether; ketones such as benzophenone and Michler's ketone; azo compounds such as azobisisobutyronitrile; and quinones such as anthraquinone. It has also been known that the incorporation of a specific combination of these photopolymerization initiators in a coating composition will remarkably improve the coating composition in curability. For example, Japanese Patent Application Laying-Open Gazette No. 15202/72 discloses an ultraviolet light curable coating composition for printing inks, the composition containing a resin having acrylic components on the side chain and a blend of Michler's ketone and benzophenone as a photosensitizer.

However, said blend of the photosensitizers has the following disadvantage particularly caused by the use of benzophenone although it has excellent sensitizing capability. The disadvantage is that when curing an ultraviolet light curable coating composition containing Michler's ketone and benzophenone as a blend of photopolymerization initiators, it will emit a badly offensive odor or stench derived from said blend before and after irradiation of ultraviolet light although air pollution otherwise caused by solvent evaporation is eliminated, thus resulting in causing stench pollution.

This invention is based on the discovery that the use of a combination of specific photopolymerization initiators in an ultraviolet light curable coating composition will remarkably improve the coating composition in curability, the specific photopolymerization initiators do not emit an offensive odor before and after irradiation of ultraviolet light for curing the coating composition and o-benzoylbenzoic acid particularly used in this invention is known as an intermediate for anthraquinone useful as dyestuff and is easily available because of its industrial production.

The ultraviolet light curable coating compositions of this invention comprise (1) at least one of a monomer and prepolymer containing at least one radically crosslinkable ethylenically unsaturated double bond, and (2) a photopolymerization initiator comprising (a) 4, 4'-bis(diethylamino) benzophenone and (b) a lower alkyl ester of p- or o-benzoylbenzoic acid or a derivative thereof in a ratio by weight of (a) to (b) of 1 : 1 to 1 : 10.

The monomers having at least one radically crosslinkable ethylenically unsaturated double bond according to this invention include styrene and its derivatives; (meth)acrylic acid and the derivatives thereof such as methyl (meth)acrylate, ethyl (meth)acrylate, butyl (meth)acrylate and 2-ethylhexyl (meth)acrylate; esters of (meth)acrylic acid and a polyhydric alcohol, such as ethylene glycol di(meth) acrylate, diethylene glycol di(meth)acrylate, 1, 6-hexanediol di(meth)acrylate, 1, 3-butanediol di(meth) acrylate, trimethylolpropane triacrylate, pentaerithritol di(meth) acrylate and pentaerithritol tri(meth)acrylate.

The terms "(meth)acrylic acid" and "(meth)acrylate" used herein are intended to mean "acrylic acid and methacrylic acid" and "acrylate and methacrylate", respectively.

The prepolymers used according to this invention may be heretofore known and include, for example, reaction products of acrylic or methacrylic acid and an epoxy resin produced from bisphenol A and epichlorohydrin; reaction products of acrylic or methacrylic acid and an epoxy resin produced from epichlorohydrin and a dicarboxylic acid such as phthalic or hexahydrophthalic acid; reaction products obtained by esterifying a fatty acid-modified alkyd resin containing free hydroxyl groups with acrylic or methacrylic acid; and unsaturated polyesters.

The photopolymerization initiators which may be used in this invention include mixtures of (a) 4, 4'-bis(-diethylamino) benzophenone and (b) a lower alkyl ester of p- or o-benzoylbenzoic acid or a derivative thereof. The lower alkyl esters of p- or o-benzoylbenzoic acid used herein may be those produced by esterifying the p- or o-benzoylbenzoic acid with methyl alcohol, ethyl alcohol, propyl alcohol, butyl alcohol or the like; the derivatives of the esters may illustratively be produced by subjecting the benzene nucleus of said esters to substitution with a halogen atom or alkyl group.

The amount of the mixed photopolymerization initiator contained in the ultraviolet light curable coating composition of this invention may be in the range of 0.5 – 25%, preferably 1 – 15% by weight of the composition; the mixed initiator may be used in a relatively more amount when the coating composition contains a pigment or the like which interrupts the transmission of ultraviolet light through the composition, while it may be used in a relatively small amount when the coating composition contains none of such pigment or the like.

Where necessary, the ultraviolet light curable coating composition of this invention may be incorporated with other non-crosslinkable resins, pigments and dyestuffs as colorants, reactive diluents for adjusting the viscosity of the composition, and other various suitable additives.

This invention will be better understood by the following Examples wherein all parts are by weight unless otherwise specified.

EXAMPLE 1

A reactor vessel provided with a refluxing condenser and a stirrer was charged with 190 parts of an epoxy compound (produced under the trademark of Epikote 828 by Shell Chemical Inc.), 72 parts of acrylic acid, 0.6 parts of triethylamine and 0.3 parts of hydroquinone to form a mixture which was then heated to 100° C for 20 hours thereby obtaining a liquid prepolymer having an acid value of 5. A mixture of 60 parts of the prepolymer so obtained and 40 parts of diethylene glycol diacrylate, was incorporated with 2 parts of each of (A) benzoin ethyl ether, (B) a mixture of Michler's ketone and benzophenone in a ratio by weight of 1 : 8, (C) a mixture of Michler's ketone and methyl o-benzoylbenzoate in a ratio by weight of 1 : 8, (D) a mixture of 4, 4'-bis (diethylamino) benzophenone and methyl p-benzoylbenzoate in a ratio by weight of 1 : 8 and (E) a mixture of 4, 4'-bis(diethylamino) benzophenone and methyl o-benzoylbenzoate in a ratio by weight of 1 : 8, thereby obtaining varnishes (1 - A), (1 - B ), (1 - C), (1 - D) and (1 - E).

Each of the varnishes so obtained was coated to a thickness of 50μ on a steel plate and the steel plate so coated was placed on a conveyor for being passed 15 cm below a 2 - KW high pressure mercury lamp to cure the coating. The sensitivity of each of the varnishes tested was expressed in terms of the travelling speed of the conveyor required for the cure of the coating. The results are shown in the following Table 1.

Table 1

| Designation of varnish | Sensitivity m/min. | Odor emitted after irradiation |
| --- | --- | --- |
| 1 - A | 15 | Some |
| 1 - B | 20 | Some |
| 1 - C | 15 | None |
| 1 - D | 25 | None |
| 1 - E | 25 | None |

From Table 1 it is apparent that the varnishes respectively containing the mixed photopolymerization initiator (D - 1) and (E - 1) exhibited excellent sensitivity when irradiated and also exhibited no odor after irradiated.

EXAMPLE 2

The procedure of Example 1 was followed except that 70 parts of an unsaturated polyester resin (produced under the trademark of Goselac by Nippon Gosei Chemical Co., Ltd.) and 30 parts of styrene were substituted for the epoxy compound and the acrylic acid, thereby to obtain varnishes (2 - A), (2 - B), (2 - C), (2 - D) and (2 - E).

Table 2

| Designation of varnish | Sensitivity m/min. | Odor emitted after irradiation |
| --- | --- | --- |
| 2 - A | 15 | Some |
| 2 - B | 15 | Some |
| 2 - C | 15 | None |
| 2 - D | 25 | None |
| 2 - E | 20 | None |

EXAMPLE 3

Linseed oil fatty acid (57.3 parts), 27.6 parts of trimethylolpropane and 10 parts of phthalic anhydride were reacted together in a carbonic acid gas stream at 230° C for 4 hours to obtain a product having an acid value of 5. The thus-obtained product after cooled was incorporated with 15 parts of benzene, heated, incorporated dropwise with a solution of 9 parts of acrylic acid, 0.1 part of hydroquinone and 0.5 parts of p-toluenesulfonic acid, after which the whole mass was reacted at 100° – 120° C for 25 hours to obtain a resin having an acid value of 5.

There were prepared red printing inks (3 - A), (3 - B), (3 - C), (3 - D), and (3 - E) using the thus-obtained resin in accordance with the following formulation.

| | |
| --- | --- |
| Carmine 6 BH (trademark : a red colorant produced by Toyo Ink Mfg. Co., Ltd.) | 15 Parts |
| The aforesaid resin | 56 Parts |
| White vaseline | 4 Parts |
| Each of the mixed photopolymerization initiators of Example 1 | 10 Parts |
| Trimethylolpropane triacrylate | 15 Parts |

Each of the red printing inks so prepared was printed on art paper in an amount of 30 mg/100 cm² by the use of a RI tester produced by Akira Works, Japan. The prints so obtained were tested in the same manner as in Example 1 and the results are shown in Table 3.

Table 3

| Designation of printing ink | Sensitivity m/min. | Odor emitted after irradiation |
| --- | --- | --- |
| 3 - A | 25 | Some |
| 3 - B | 30 | Some |
| 3 - C | 28 | None |
| 3 - D | 40 | None |
| 3 - E | 35 | None |

EXAMPLE 4

The procedure of Example 1 was repeated three times except that 4, 4'-bis(diethylamino) benzophenone and methyl ortho-benzoylbenzoate, which were jointly used as a mixed photopolymerization initiator, were used in a varied ratio in each time as indicated in the following Table 4. Approximately the same result was obtained in each time as shown in Table 4.

Table 4

| Test No. | 4,4'-bis(diethylamino)benzophenone/methyl ortho-benzoylbenzoate (weight ratio) | Sensitivity (m/min.) |
| --- | --- | --- |
| 1 | 1 : 2 | 25 |
| 2 | 1 : 5 | 25 |
| 3 | 1 : 9 | 23 |

EXAMPLE 5

The procedure of Example 4 was followed except that methyl para-benzoylbenzoate was substituted for the orthobenzoylbenzoate. Approximately the same result was obtained in each time as shown in Table 5.

TABLE 5

| Test No. | 4,4'-bis(diethylamino)benzophenone/methyl para-benzoylbenzoate (weight ratio) | Sensitivity (m/min.) |
| --- | --- | --- |
| 1 | 1 : 2 | 23 |
| 2 | 1 : 5 | 25 |
| 3 | 1 : 9 | 25 |

EXAMPLE 6

The procedure of Example 4 was followed except that ethyl o-benzoylbenzoate was substituted for the methyl o-benzoylbenzoate. Substantially the same result as in Example 4 was obtained.

EXAMPLE 7

The procedure of Example 4 was followed except that methyl o-(4-chlorobenzoyl)-benzoate was substituted for the methyl o-benzoylbenzoate. There was obtained substantially the same result as obtained in Example 4.

EXAMPLE 8

The procedure of Example 5 was followed except that ethyl p-benzoylbenzoate was substituted for the methyl p-benzoylbenzoate. There was obtained substantially the same result as obtained in Example 5.

EXAMPLE 9

The procedure of Example 5 was followed except that methyl p-(4-chlorobenzoyl)-benzoate was substituted for the methyl p-benzoylbenzoate. There was obtained substantially the same result as obtained in Example 5.

What is claimed is:

1. An ultraviolet light curable coating composition comprising (1) at least a member selected from the group consisting of monomers and prepolymers containing at least one radically crosslinkable ethylenically unsaturated double bond and (2) a photopolymerization initiator containing (a) 4, 4'-bis(diethylamino) benzophenone and (b) a member selected from the group consisting of lower alkyl esters of p-and o-benzoylbenzoic acids and the derivatives thereof in a ratio by weight of (a) to (b) of 1 : 1 to 1 : 10.

2. An ultraviolet light curable coating composition according to claim 1, wherein the photopolymerization initiator (2) is contained in an amount of 0.5 - 25% by weight of the composition.

3. An ultraviolet light curable coating composition according to claim 1, wherein the monomer is a member selected from the group consisting of styrene and the derivatives thereof, acrylic acid, methacrylic acid, methyl (meth)acrylate, ethyl (meth)acrylate, butyl (meth)acrylate, 2-ethylhexyl (meth)acrylate, ethylene glycol di(meth)acrylate, diethylene glycol di(meth)acrylate, 1,6-hexanediol di(meth) acrylate, 1,3-butanediol di(meth)acrylate, trimethylolpropane triacrylate, pentaerithritol di(meth)acrylate and pentaerithritol tri(meth)acrylate; and the prepolymer is a member selected from the group consisting of a) a reaction product of acrylic or methacrylic acid and an epoxy resin prepared from bisphenol A and epichlorohydrin, b) a reaction product of acrylic or (meth)acrylic acid and an epoxy resin prepared from epichlorohydrin and phthalic or hexahydrophthalic acid, c) a product prepared by the esterification of a hydroxyl group-containing, fatty acid-modified alkyd resin with (meth)acrylic acid, and d) unsaturated polyesters.

4. An ultraviolet light curable coating composition according to claim 2, wherein the monomer is a member selected from the group consisting of styrene and the derivatives thereof, acrylic acid, methacrylic acid, methyl (meth)acrylate, ethyl (meth)acrylate, butyl (meth)acrylate, 2-ethylhexyl (meth)acrylate, ethylene glycol di(meth)acrylate, diethylene glycol di(meth)acrylate, 1,6-hexanediol di(meth) acrylate, 1,3-butanediol di(meth)acrylate, trimethylolpropane triacrylate, pentaerithritol di(meth)acrylate and pentaerithritol tri(meth)acrylate; and the prepolymer is a member selected from the group consisting of a) a reaction product of acrylic or methacrylic acid and an epoxy resin prepared from bisphenol A and epichlorohydrin, b) a reaction product of acrylic or (meth)acrylic acid and an epoxy resin prepared from epichlorohydrin and phthalic or hexahydrophthalic acid, c) a product prepared by the esterification of a hydroxyl group-containing, fatty acid-modified alkyd resin with (meth)acrylic acid, and d) unsaturated polyesters.

5. The composition according to claim 1 which additionally comprises at least one member selected from the group consisting of pigments, dyestuffs, non-crosslinkable resins and diluents.

6. The composition according to claim 3 wherein the prepolymer is the reaction product of acrylic acid and an epoxy resin and the monomer is diethylene glycol diacrylate.

7. The composition according to claim 3 wherein the prepolymer is an unsaturated polyester resin and the monomer is styrene.

8. The composition according to claim 3 wherein the monomer is trimethylolpropane triacrylate and the prepolymer is the reaction product of linseed oil fatty acid, phthalic acid and trimethylolpropane which has been further reacted with acrylic acid.

* * * * *